United States Patent [19]

Brown

[11] Patent Number: 5,023,318

[45] Date of Patent: Jun. 11, 1991

[54] PROCESS FOR PREPARING POLYKETONES FROM CARBON MONOXIDE/OLEFIN WITH AMIDE OR ACETONITRILE

[75] Inventor: Stephen L. Brown, Middlesex, England

[73] Assignee: The British Petroleum Company, p.l.c., London, England

[21] Appl. No.: 529,737

[22] Filed: May 23, 1990

Related U.S. Application Data

[63] Continuation of Ser. No. 249,715, Sep. 27, 1988, abandoned.

[30] Foreign Application Priority Data

Oct. 8, 1987 [GB] United Kingdom ............... 8723602

[51] Int. Cl.$^5$ ............................................. C08G 67/02
[52] U.S. Cl. ................................................... 528/392
[58] Field of Search ......................................... 528/392

[56] References Cited

U.S. PATENT DOCUMENTS 4,806,630  2/1989  Drent et al. .......................... 528/392

Primary Examiner—Harold D. Anderson
Attorney, Agent, or Firm—Brooks Haidt Haffner & Delahunty

[57] ABSTRACT

A process for preparing an interpolymer of one or more olefins with carbon monoxide is disclosed. The process, which comprises reacting the olefin(s) with carbon monoxide in the presence of a palladium catalyst prepared by reacting together for example palladium acetate, 1,3-bis (diphenylphosphino)propane and para-toluenesulphonic acid, is improved by having an amide or nitrile present. The presence of an amide or nitrile improves reaction rates and reduces the amount of catalyst incorporated into the polyketone. A preferred additive is dimethylformamide.

7 Claims, No Drawings

PROCESS FOR PREPARING POLYKETONES FROM CARBON MONOXIDE/OLEFIN WITH AMIDE OR ACETO NITRILE

This application is a continuation of application Ser. No. 07/249,715, filed 9/27/88 abandoned The present invention relates to an improved process for producing polyketones by polymerising a mixture of one or more olefins and carbon monoxide in the presence of a palladium catalyst.

It is known from U.S. Pat. No. 3,694,412 that high molecular weight interpolymers of aliphatic monoolefins and carbon monoxide can be prepared by reacting one or more aliphatic olefins with carbon monoxide in the presence of an aryl phosphine complex of palladium. However, it is also known that such reactions are slow even at elevated temperature and pressure.

More recently, European patent applications 121965 and 181014 describe improved versions of the process described in U.S. Pat. No. 3,694,412. The improved processes described use a complex compound, obtained by reaction of a palladium, cobalt or nickel compound with an anion of an acid with a pKa lower than 2 and a bidentate phosphine, arsine or stibine, as catalyst. Such a catalyst system causes, in some cases, a more than two orders of magnitude enhancement in reaction rate. These documents also disclose that the polymerisation is suitably carried out in the presence of a liquid diluent selected from lower alcohols, ethers and glycol ethers.

It has now been found that processes of the type exemplified by EP 121965 and EP 181014 can be further improved by using a diluent containing an amide or nitrile. When the process is carried out in the presence of an amide two valuable advantage accrue; first the rate of reaction is improved and second the amount of catalyst incorporated into the polyketone is reduced. The second advantage is particularly important when palladium catalysts are used as they are expensive. Thus, if an amide is employed, the palladium catalyst can easily be separated from the polymer and recycled for further use.

It has also been found that the use of an amide results in the polymer formed being white as opposed to yellow or grey.

Accordingly, the present invention provides a process for preparing polyketones by reacting a mixture of carbon monoxide and one or more olefins in the presence of a palladium catalyst prepared by reacting together (1) a source of palladium, (2) an amine, phosphine, arsine or stibine and (3) a non-coordinating or weakly coordinating anion characterised in that the process is carried out in the presence of an effective amount of an amide or nitrile.

The term polyketone is used herein to mean an interpolymer of one or more olefins with carbon monoxide. The idealised structure of such a material would comprise a one, two or three dimensional network of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

The amide used is suitably one of formula

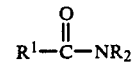

wherein $R^1$ is hydrogen or $C_1$ to $C_6$ alkyl and the R groups are independently $C_1$ to $C_6$ alkyl. Alternatively the amide may be a cyclic amide e.g. N-methylpyrrolidone or substituted derivatives thereof or an aryl amide e.g. benzamide. Most preferably the amide is dimethylformamide. The nitrile is suitably either acetonitrile or benzonitrile.

The amide or nitrile is used in the sense of being an additive to the catalyst. Thus, it is desirable to carry out the polymerisation process in an inert, non- or weakly coordinating solvent such as a lower alcohol, e.g. methanol, ethanol and propanol, an ether, a glycol or a glycol ether. The most preferred solvents being methanol and ethoxyethanol. It is also preffered that the molar ratio of amide to palladium is in the range 1:1 to 100:1.

The palladium catalyst used in the process described above is itself prepared by reacting together a source of palladium, an amine, phosphine, arsine or stibine and anion which is unable to coordinate to the palladium or one which coordinates only weakly. As regards the source of palladium this can include simple inorganic and organic salts e.g. halides, nitrates, carboxylates and the like as well as organometallic and coordination complexes. In some cases, by suitable choice of coordination complex it may be possible to add the palladium and the amine, phosphine, arsine or stibine at the same time.

Although any source of palladium can be used, it may be necessary, when a palladium complex having strongly coordinating ligands is employed, to ensure that such ligands are removed. An example of such a complex is the organic salt palladium acetate since the acetate anions strongly bind to the palladium. A convenient way of removing such anions is to contact the salt with a strong acid (e.g. one having a pKa of less than 2 when measured at 25° C. in water) whose conjugate anion is either non coordinating or weakly coordinating. Such an acid therefore not only removes the strongly bound anions by protonation but also acts as a source of the non- or weakly coordinating anion. Examples of such acids include $CF_3CO_2H$, $CCl_3CO_2H$, $CCl_2HCO_2H$, $HBF_4$, $HPF_6$, $HSbF_6$, para-toluene sulphonic acid and the like.

Turning to the amines, phosphines, arsines and stibines which can be employed, these should be ones which coordinate strongly to the palladium. One class of such compounds are those having the general formula $R^2{}_3X$ where $X=N$, P, As or Sb and the $R^2$ groups are independently either $C_1$ to $C_6$ alkyl or phenyl or tolyl groups. A more preferred class of such compounds however are those having the general formula $(R^2)_2X$—$R^3$—$X(R^2)_2$ where X and $R^2$ are as above, and $R^3$ is an alkylene group preferably one having the formula —$(CH_2)_a(CHR^4)_b$— where $R^4$ is $C_1$ to $C_4$ alkyl and a and b are either zero or integers such that a+b is at least 2, preferably between 2 and 10. Most preferred are the phosphines and particularly suitable phosphines include triphenylphosphine and $Ph_2P(CH_2)_cPPh_2$ where Ph=phenyl and c=2 to 5.

It is preferable that the molar ratio of amine, phosphine, arsine or stibine to palladium is at least 1:1 preferably 1:1 to 5:1.

As regards the non-coordinating or weakly coordinating anion, suitable examples include the conjugate anions of the acids described earlier as well as anions having the formula:

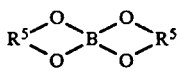

where the $R^5$ groups are independently selected from $C_1$ to $C_6$ alkylene groups, ortho-phenylene groups or groups having the formula

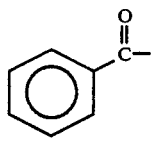

or substituted derivates thereof

It is preferably that the molar ratio of anion to palladium is at least 1:1 most preferably 1:1 to 50:1.

Considering next the feedstocks for the polymerisation, it is believed that any source of carbon monoxide can be used.

Although any olefin may be polymerised by this process it has been found that reaction rates are fastest when ethylene or mixtures of olefins containing ethylene are used. However this should not be construed as limiting the invention to ethylene containing feedstocks since other olefins e.g styrene, 4-methylpentene-1, vinyl acetate, acrylates all eact to some extent. If mixtures of olefins are used suitable examples include ethylene/propylene, ethylene/butylene and ethylene/styrene mixtures.

The polymerisation is preferably carried out at a temperature in the range 20° to 150° C., most preferably in the range 50° to 130° C., and at elevated pressure e.g. 1 to 100 bars pressure. The process may be carried out either batchwise or continuously.

The following Examples illustrate the invention.

EXAMPLE 1

A stainless steel autoclave of 150 ml capacity was charged with palladium acetate (25 mg), 1,3-bis(diphenylphosphino)propane (65 mg), para-toluenesulphonic acid (380 mg), dimethylformamide (0.27 ml), 1,2-dimethoxyethane (30 ml) and a magnetic stirrer bar. The autoclave was flushed with nitrogen, charged with ethylene (20 bar) followed by carbon monoxide (30 bar), and heated to 100° C. A pressure drop of 22.2 bar was recorded over 1 hour. The autoclave was allowed to cool over a period of 1½ hours and was vented at 50° C. 5.18 g polymer was subsequently recovered by filtration under a nitrogen atmosphere. The filtrate was returned to the autoclave and the reaction repeated. A pressure drop of 11.2 bar was recorded over 1 hour. The autoclave was allowed to cool over a period of 1½ hours and was vented at 50° C. 4.52 g of polymer was subsequently recovered.

COMPARATIVE TEST A

The method of Example 1 was repeated except with the omission of the DMF. In the first instance, a pressure drop of 14.0 bar and a polymer yield of 3.12 g were recorded. On repeating the reaction with the recovered filtrate, a pressure drop of 1.0 bar and a polymer yield of 270 mg were recorded.

EXAMPLE 2

The method of Example 1 was repeated except that the 1,2-dimethoxyethane was replaced by methanol (30 ml). A pressure drop of 30.5 bar and a polymer yield of 4.93 g were recorded in the first instance. On repeating the reaction with the recovered filtrate, a pressure drop of 28.7 bar and polymer yield of 5.54 g were recorded.

COMPARATIVE TEST B

The method of Example 2 was repeated, except with the omission of the DMF. In the first instance, a pressure drop of 25.6 bar and polymer yield of 5.07 g were recorded. On repeating the reaction with the recovered filtrate, a pressure drop of 7.4 bar and a polymer yield of 2.11 g were recorded.

EXAMPLE 3

The method of Example 2 was repeated, except that the DMF was replaced by dimethylacetamide (0.37 ml). In the first instance, a pressure drop of 27.0 bar and polymer yield of 5.84 g were recorded. On repeating the reaction with the recovered filtrate, a pressure drop of 13.5 bar and a polymer yield of 2.32 g were recorded.

COMPARATIVE TEST C

The method of Example 2 was repeated, except that the DMF was replaced by dimethylsulphoxide (0.35 ml). In the first instance, a pressure drop of 24.7 bar and polymer yield of 4.94 g were recorded. On repeating the reaction with the recovered filtrate, a pressure drop of 8.2 bar and polymer yield of 2.06 g were recorded.

These results are directly comparable with those of Comparative Test B, and show no advantage to be gained by the inclusion of dimethylsulphoxide.

EXAMPLE 4

Example 2 was repeated except that the DMF was replaced by 0.21 ml of acetonitrile. In the first instance, a pressure drop of 27.9 bar and a polymer yield of 5.18 g was recorded. On repeating the experiment with recovered filtrate a pressure drop of 19.7 bar and a polymer yield of 2.55 g were obtained.

I claim:

1. A process for preparing polyketones by reacting a mixture of carbon monoxide and one or more olefins in the presence of a palladium catalyst prepared by reacting together (1) a source of palladium, (2) an amine, phosphine, arsine or stibine and (3) a non-coordinating or weakly coordinating anion, wherein the reacting is in the presence of an effective amount of an amide or of a nitrile comprising acetonitrile.

2. A process as claimed in claim 1 wherein the amide is one of formula $R^1CONR_2$ wherein $R^1$ is hydrogen or $C_1$ to $C_6$ alkyl and the R groups are independently $C_1$ to $C_6$ alkyl.

3. A process as claimed in claim 2 wherein the amide is dimethylformamide.

4. A process as claimed in claim 1 wherein the molar ratio of amide to palladium is in the range 1:1 to 100:1.

5. A process as claimed in claim 1 carried out in either methanol or ethoxyethanol.

6. A process as claimed in claim 1 wherein the one or more olefins are selected from the group consisting of ethylene, propylene, ethylene/propylene mixtures and ethylene/styrene mixtures.

7. A process for preparing polyketones by reacting a mixture of carbon monoxide and one or more olefins in the presence of a palladium catalyst prepared by reacting together (1) a source of palladium, (2) an amine, phosphine, arsine or stibine and (3) a non-coordinating or weakly coordinating anion, wherein the reacting is in the presence of an effective amount of an amide.

* * * * *

UNITED STATES PATENT AND TRADEMARK OFFICE
CERTIFICATE OF CORRECTION

PATENT NO. :   5,023,318
DATED     :   June 11, 1991
INVENTOR(S) :  STEPHEN L. BROWN It is certified that error appears in the above-identified patent and that said Letters Patent is hereby corrected as shown below:

Col. 3, l. 32, correct the spelling of "react"

Claim 1, line 7 and 8, strike "a nitrile comprising"

Signed and Sealed this

Ninth Day of February, 1993

Attest:

STEPHEN G. KUNIN

Attesting Officer

Acting Commissioner of Patents and Trademarks